United States Patent

Nishitani et al.

[11] Patent Number: 5,957,653
[45] Date of Patent: Sep. 28, 1999

[54] TRANSFERRING APPARATUS

[75] Inventors: Yujiro Nishitani, Inuyama; Akito Tai, Kagamigahara, both of Japan

[73] Assignee: Murata Kikai Kabushiki Kaisha, Kyoto, Japan

[21] Appl. No.: 08/989,770

[22] Filed: Dec. 12, 1997

[30] Foreign Application Priority Data

Jan. 6, 1997 [JP] Japan .................................. 9-012001

[51] Int. Cl.$^6$ ................................................. B65G 60/00
[52] U.S. Cl. ..................................... 414/790.9; 414/788.4; 414/789.6; 414/791.6
[58] Field of Search ........................ 414/790.9, 788.4, 414/791.6, 789.6

[56] References Cited

U.S. PATENT DOCUMENTS

| | | | |
|---|---|---|---|
| 3,517,831 | 6/1970 | Hahn | 414/789.6 |
| 4,599,025 | 7/1986 | Borsuk et al. | 414/790.9 |
| 4,793,118 | 12/1988 | Meier | 414/788.4 |
| 4,976,584 | 12/1990 | Focke | 414/790.9 |
| 4,979,870 | 12/1990 | Mojden et al. | 414/788.4 |
| 5,222,857 | 6/1993 | Hasegawa | 414/788.4 |
| 5,525,029 | 6/1996 | Taylor | 414/790.9 |
| 5,533,861 | 7/1996 | Klupfel | 414/791.6 |
| 5,788,460 | 8/1998 | Campau | 414/791.6 |

FOREIGN PATENT DOCUMENTS

| | | | |
|---|---|---|---|
| 5147743 | 6/1993 | Japan | 414/788.4 |
| 7-14266 | 4/1995 | Japan . | |
| 1366356 | 1/1988 | U.S.S.R. | 414/788.4 |

*Primary Examiner*—Christopher P. Ellis
*Assistant Examiner*—Douglas Hess
*Attorney, Agent, or Firm*—Armstrong, Westerman, Hattori, McLeland & Naughton

[57] ABSTRACT

A transferring apparatus which enables articles interlock-stacked on a pallet for a single-article to be bar-stacked on a shipping pallet includes lifters 4, 6 for shipping pallets (transferring pallets) B, C provided on the respective sides of a lifter 2 for a pallet for a single-article A, and a carriage 20 which picks up one layer of articles at a time from the pallet for a single-article A and alternatively transfers the layers of articles to the two transferring pallets B, C. According to this configuration, it is possible to load only odd- or only even-numbered layers of the pallet for a single-article A onto the transferring pallets B, C.

5 Claims, 4 Drawing Sheets

TRANSFERRING APPARATUS

FIELD OF THE INVENTION

The present invention relates to the transferring apparatus for articles from a pallet for a single-article to two pallets for shipment, and is suitable for use in an automatic warehouse.

BACKGROUND OF THE INVENTION

In an automatic warehouse, articles are often transferred from a pallet for a single-article to a pallet for shipment (a transferring pallet). The pallet for a single-article is one type of articles stacked thereon, such as a plurality of the same article interlock-stacked. Said interlock-stacking stacks different layers of articles in different manners, is often used for shipment from a plant and so on, and is preferable when each type of a large number of articles is stocked in an automatic warehouse. Thus, articles are generally interlock-stacked on the pallet for a single-article. Most of the pallets to which the articles are transferred are used to mount thereon articles to be shipped from the automatic warehouse, and a single or plural types of articles may be loaded thereon. There are known apparatuses in which a pallet for a single-article and a transferring pallet are placed on an elevation means such as a lifter, and in which a carriage travelling on a transfer path such as rails picks up one layer of articles at a time from the pallet for a single-article to transfer them to the transferring pallet. This apparatus, however, interlock-stacks the articles if they have been interlock-stacked on the pallet for a single-article. This is because this apparatus only transfers one layer of articles at a time from the pallet for a single-article to the transferring pallet and because it does not have a means for changing the direction of the articles.

Interlock-stacking is likely to prevent the articles from collapsing, but is not suitable for manual unloading. This is due to the different directions of different layers (stages) of articles. Interlock-stacking includes brick stacking, alternate stacking, pinwheel stacking, and split stacking, and is characterized by the differing arrangements of vertical lines in different layers, which can be viewed from the side of the articles. On the contrary, bar stacking, which is simple stacking in which all layers of articles are arranged in the same direction, is likely to cause the articles to collapse and is not suitable for massive transfers, but is suitable for small-size transfers due to its convenience for manual unloading.

An object of the present invention is to automatically bar-stack articles interlock-stacked on a pallet for a single-article to allow them to be transferred to a transferring pallet.

An additional object of the present invention is to enable articles to be transferred from a pallet for a single-article to a transferring pallet at a high speed.

A further additional object of the present invention is to enable it to be easily determined whether articles on a pallet for a single-article to be transferred next belong to an odd- or even-numbered layer, in order to enable bar stacking to be maintained even when articles are transferred from a plurality of pallets for a single-article.

SUMMARY OF THE INVENTION

This invention is a transferring apparatus comprising a means for elevating and lowering a pallet for a single-article, a means for elevating and lowering a transferring pallet, a carriage for picking up one layer of articles at a time from the pallet for a single-article to unload them onto the transferring pallet, and a means for regulating a transfer path for the carriage, characterized in that the apparatus includes a plurality of means for elevating and lowering the transferring pallet along the transfer path for the carriage, and a control means for controlling the carriage to unload onto each transferring pallet in the transferring pallet elevation means only odd- or even-numbered layers of articles from the pallet for a single-article.

Preferably, one transferring pallet elevation means is provided on each side of an elevation means for the pallet for a single-article.

Preferably, the apparatus has a means for determining from the elevation position of the elevation means for the pallet for a single-article whether the top layer on the pallet for a single-article is an even- or odd-numbered layer.

The present invention provides a plurality of means for elevating and lowering the transferring pallet along the transfer path for the carriage, and a control means for controlling the carriage to unload onto each transferring pallet in the transferring pallet elevation means only odd- or even-numbered layers of articles from the pallet for a single-article. Thus, if there are two transferring pallets, only odd-numbered layers of articles can be stacked on a first transferring pallet, while only even-numbered layers of articles can be stacked on a second transferring pallet. The control means controls which layers of articles are to be stacked on each transferring pallet. As a result, articles interlock-stacked on a pallet for a single-article can be bar-stacked on the transferring pallets.

According to the present invention, one transferring pallet elevation means is provided on each side of the elevation means for the pallet for a single-article, thereby reducing the distance over which the carriage moves between the pallet for a single-article and the transferring pallet. Furthermore, since the rate at which the carriage operates without articles is low, articles can be transferred at a high speed.

The present invention has a means for determining from the elevation position of the elevation means for the pallet for a single-article whether the top layer of the pallet for a single-article is an even- or odd-numbered layer. Whether a particular layer is an even- or odd-numbered layer may be determined by counting from the top layer when the pallet is full, or from the floor surface of the pallet when the pallet is not full.

To enable articles to be transferred onto the carriage from the pallet for a single-article, the top surface of the articles must be at a constant height. Thus, since the top surface of the articles is at a constant height, when one layer of articles is to be transferred to the carriage, that layer can be identified by determining the elevation position of the elevation means. Consequently, it can be determined whether that layer is an even- or odd-numbered layer. As a result, accurate bar stacking can be carried out even if articles on a plurality of pallets for a single-article are transferred to a single transferring pallet.

An embodiment is shown below, but variations can be made through the use of publicly known information.

DETAILED DESCRIPTION OF THE PREFERRED EMBODIMENTS

Figure 1:
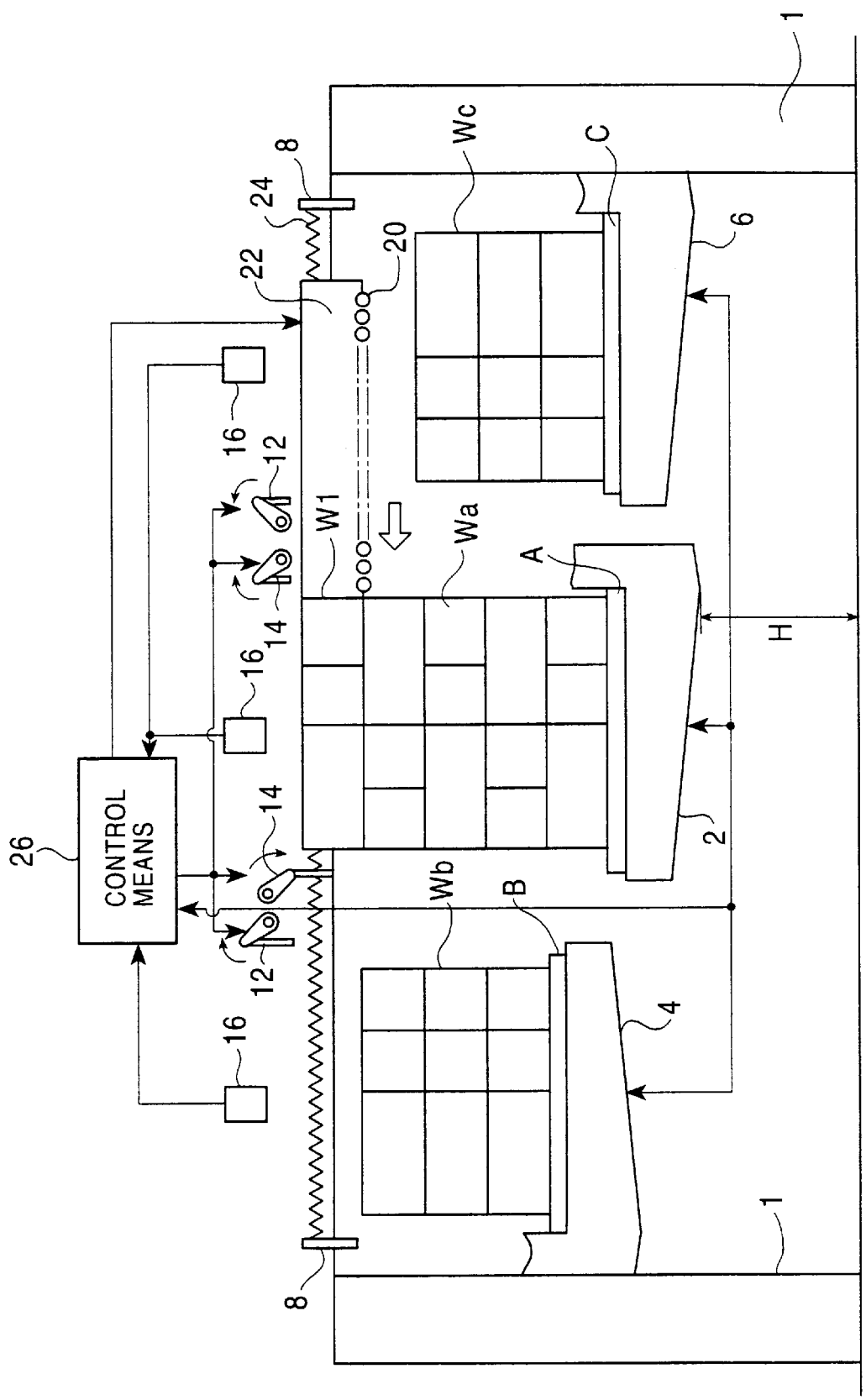
FIG. 1 shows the operational state of a transferring apparatus according to an embodiment of the present invention.
Figure 2:
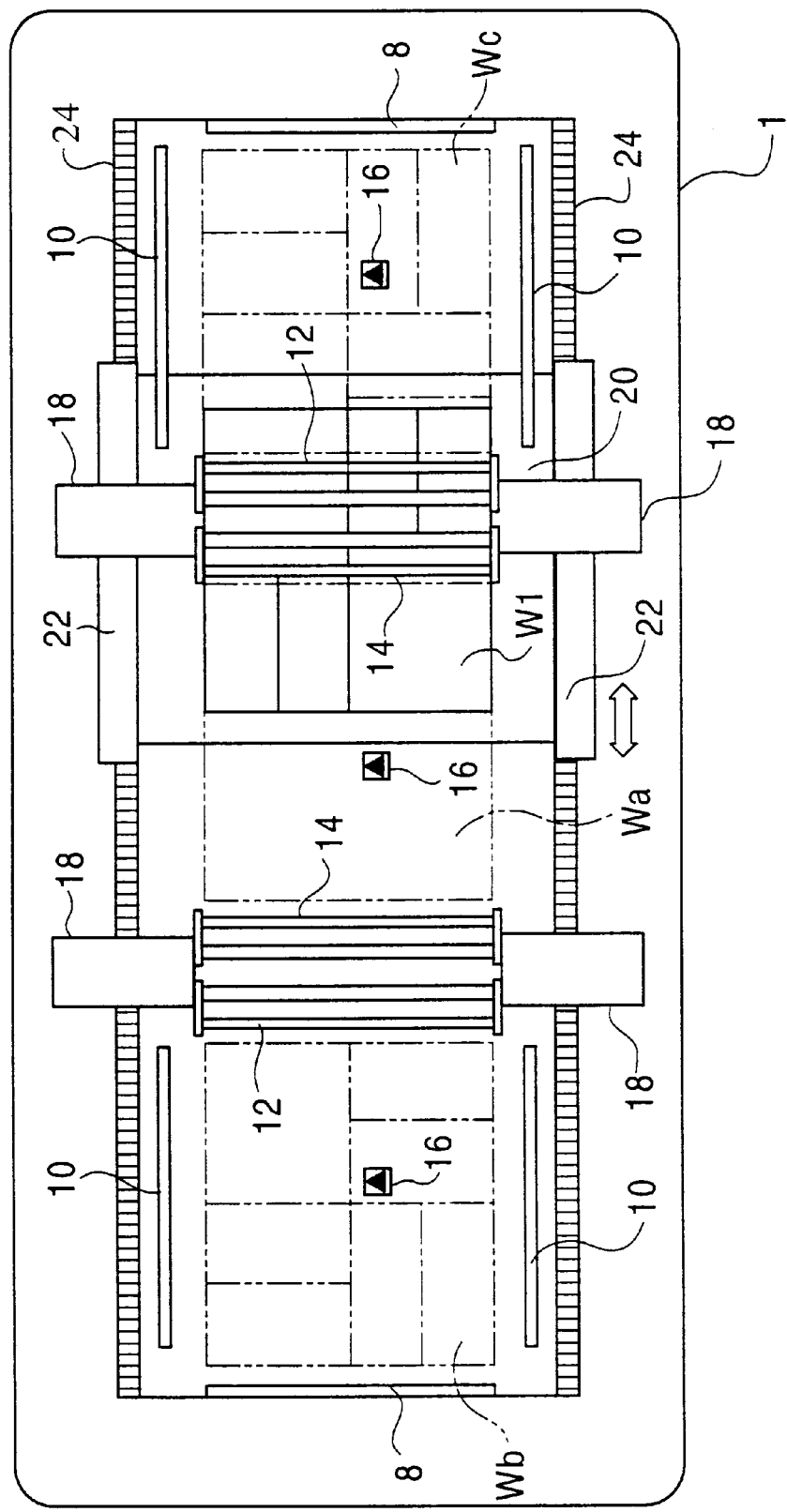
FIG. 2 is a plan view of the transferring apparatus according to the embodiment of the present invention.

FIGS. 1 to 4 show an embodiment of the present invention, and FIGS. 1 and 2 show a mechanism of a transferring apparatus.

In the figures, 1 is a frame of the transferring apparatus, and 2, 4, and 6 are lifters that serve as elevation means, wherein a central lifter 2 is used for a pallet for a single-article A and wherein side lifters 4, 6 are used for transferring pallets B. C. 8, 8 in FIG. 1 are end pushers that stop and align articles transferred by a carriage 20 and that may be movable or fixed. 10, 10 shown at the top and bottom of FIG. 2, respectively, are side pushers that align articles along either side of the transferring pallets B, C. The side pusher 10 may be movable or fixed. 12, 14 are movable pushers, and the movable pusher 12 is positioned close to the transferring pallet B, C to prevent articles from escaping with the returning carriage 20 when they are to be unloaded. In addition, the movable pusher 14 prevents articles on the pallet for a single-article A from escaping from the carriage 20 when the carriage 20 is used to pick them up. 16, 16, 16 are height sensors for measuring the height of the top surface of articles loaded on to each pallet A, B, C.

18 is a stand for the movable pushers 12, 14, and 20 is the carriage that is shown in FIG. 1 and consists of a large number of rollers. The rollers of the carriage 20 are positioned so as to pick-up one layer of articles as shown in FIG. 2, and are connected to a carriage stand 22 to allow one layer of articles to be picked-up on the carriage and transferred. 24 is a rail that defines a motion path for the carriage stand 22 and that is a rack-type rail in this embodiment.

To enable the carriage 20 to pick up articles, the boundary between the top layer and the subsequent layer must be at almost the same height as the carriage 20, and the top layer W1 of the pallet for a single-article A is monitored by the height sensor 16. Likewise, the top layers of the transferring pallets B, C are monitored by the height sensor 16, and this height must be almost the same as that of the carriage 20 when articles in the next layer are to be received.

A signal from the height sensor 16 is input to a controller 26 to control the height of each of the lifters 2, 4, 6, and the controller 26 stores the height of the lifter 2, that is, their elevation positions obtained from the accumulated values of the number of rotations of an elevation motor. The height of the lifter 2 is not limited to its literal height, but may be determined from a signal that is related to the elevation of the lifter 2 and that can be converted into a height, such as a signal indicating the number of elevation steps relative to a base position.

In addition, the controller 26 controls the movable pushers 12, 14 to allow articles to be picked up from the pallet for a single-article A by the carriage 20 and unloaded onto the transferring pallets B, C. The controller 26 controls the motion of the carriage stand 22 and allows the carriage 20 to move along a prescribed path.

Figure 3:
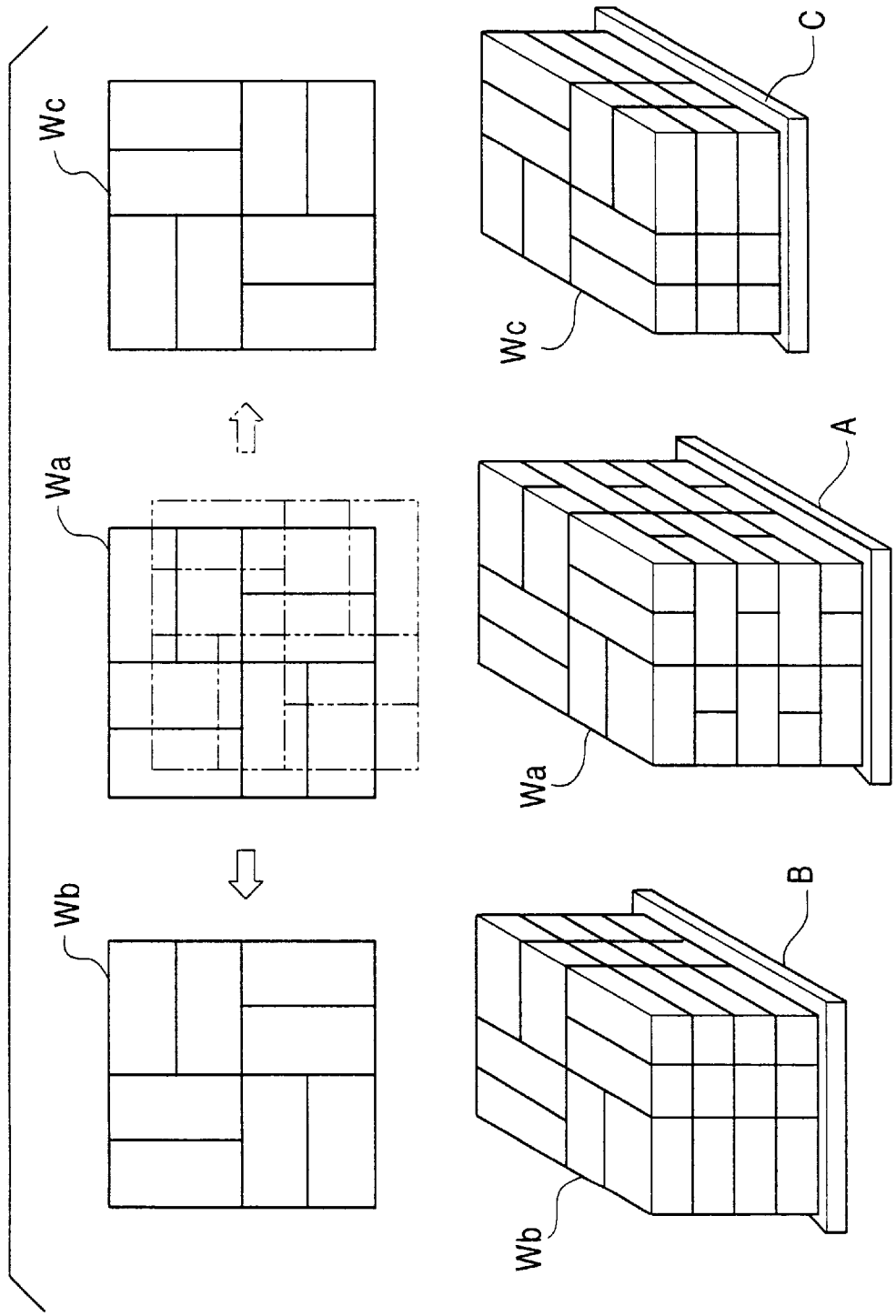
FIG. 3 shows the transfer of articles interlock-stacked on a pallet for a single-article to a transferring pallet, on which the articles are bar-stacked, according to the embodiment of the present invention.

FIG. 3 shows the relationship between the pallet for a single-article A and the transferring pallets B, C.

According to the present invention, individual layers of articles Wa from the pallet for a single-article A are alternatively transferred to the transferring pallets B, C, and only odd- or even-numbered layers of articles, the numbers of which are counted from the bottom layer on the pallet for a single-article A when the pallet is not full or from the top layer when the pallet is full, are stacked on the transferring pallets B, C. Whether a particular layer is an odd- or even-numbered layer may be determined from counting from the floor surface of the pallet for a single-article A when the pallet is not full or from the top surface when the pallet is full, and this embodiment counts from the floor surface.

To ensure ease of transportation, articles are normally interlock-stacked on the pallet for a single-article A, particularly to prevent them from collapsing as shown in FIG. 3, while articles Wb, Wc are bar-stacked on the transferring pallets B, C disposed on the respective sides of the pallet for a single-article A. If articles are bar-stacked on the pallet for a single-article A, they can be transferred to the transferring pallets B, C without the need to consider whether a particular layer is an odd- or even-numbered layer. Thus, articles can be bar-stacked on the pallet for a single-article A. Articles Wb, Wc are bar-stacked on the transferring pallets B, C as shown in FIG. 3.

Figure 4:
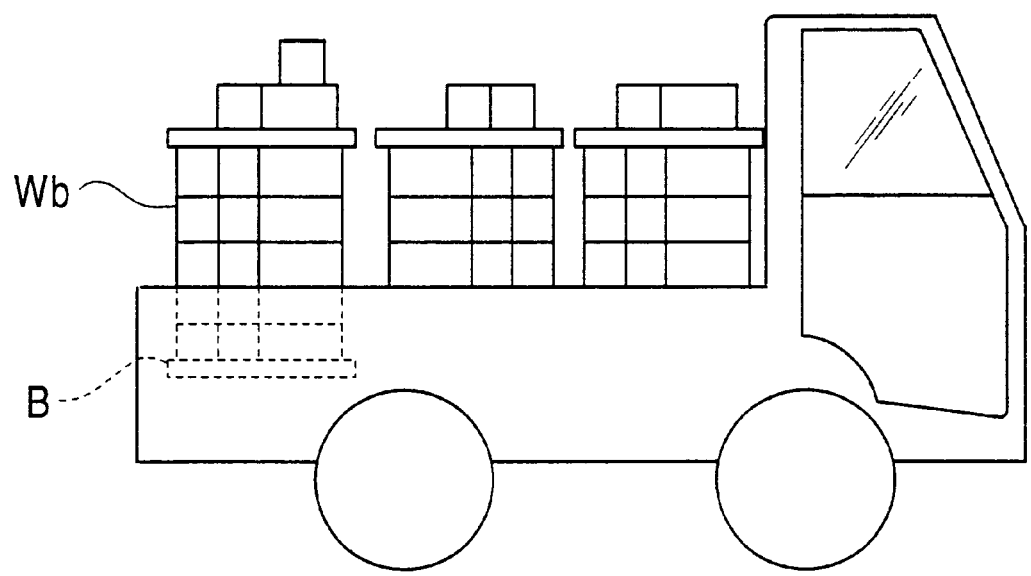
FIG. 4 shows the transportation of articles restacked according to the embodiment of the present invention.

If commodities such as boxed beer and soft drinks that can be stacked are to be shipped from a plant, they are normally interlock-stacked on pallets. A distribution center receives the commodities, which are interlock-stacked, as inventory, and bar-stacks them for shipment when there is time to do so or just prior to shipment. A single type of articles is stacked on the pallet for a single-article A as inventory, and a plurality of types of articles may be stacked on the transferring pallets B, C, or articles on a plurality of pallets for a single-article A may be transferred to one of the single transferring pallets B, C. The articles bar-stacked on the transferring pallets B, C are shipped, for example, as shown in FIG. 4 and, for example, a small number of different articles are further stacked on the pallets prior to transfer.

With reference to FIGS. 1 and 2, the operation of the embodiment is described.

The interlock-stacking involves articles positioned in two directions and, for example, the direction of the articles in the bottom layer of the pallet for a single-article A is predetermined. Alternatively, data corresponding to the direction of the articles in the bottom layer is supplied to the control means 26. Thus, by determining whether a particular layer is an odd- or even-numbered layer when counted from the bottom layer, the direction of the articles may be determined even if different articles are placed on the pallet for a single-article A.

When the pallet for a single-article A and transferring pallets B, C are placed on the lifters 2, 4, 6, the transferring pallets B, C, which have been at their elevated positions, are gradually lowered while transfer is simultaneously executed, and the pallet for a single-article A, which has been at its lowered position, is elevated on a layer-by-layer basis as transfer proceeds.

The height sensor 16 detects the position of the top surface of each of the pallets A, B, C. The control means 26 controls the lifters 2, 4, 6, and the carriage 20 moves between the top and second layers of the pallet for a single-article A to pick up one layer of articles and then moves onto the top layer of the transferring pallet B or C to unload the articles thereon. The carriage 20 moves back and forth within a stroke defined by the rails 24 shown in FIGS. 1 and 2 in order to transfer, for example, the odd-numbered layers to the transferring pallet B and the even-number layers to the transferring pallet C.

The transferring pallets B, C may be linearly positioned on one side of the pallet for a single-article A, but by disposing the transferring pallets B, C on the respective sides of the pallet for a single-article A as shown in the embodiment, the stroke of the carriage 20 is reduced doing with the rate at which the carriage 20 operates without articles, enabling articles to be transferred at a high speed.

The control means 26 monitors the height of the lifters 2, 4, 6 and stores the height H of the lifter 2 for the pallet for a single-article A (the amount of elevation from a reference point of the lifter 2). Since the top surface of the next layer to be transferred is at a constant height and the height of one layer is known, the top layer can be determined to be an even- or odd-numbered layer by determining the height H. Consequently, articles can remain bar-stacked even if they are transferred to the transferring pallets B, C from a plurality of pallets for a single-article A.

Upon completion of transfer, if there are articles remaining on the pallet for a single-article A, they are normally returned to the automatic warehouse. If only one of the transferring pallets B, C is used for shipment, the other pallet is returned to and stored in the warehouse. The articles are then shipped from the distribution center to local sales offices.

I claim:

1. A transferring apparatus comprising a means for elevating and lowering a pallet for a single-article, a means for elevating and lowering a transferring pallet, a carriage for picking up one layer of articles at a time from said pallet for a single-article to unload said layer of articles onto said transferring pallet, and a means for regulating a transfer path for said carriage, wherein the apparatus includes a plurality of means for elevating and lowering a transferring pallet along the transfer path for the carriage and a control means for controlling said carriage to unload onto each transferring pallet only odd- or only even-numbered layers of articles from said pallet for a single-article.

2. A transferring apparatus according to claim 1 wherein one of said means for elevating and lowering a transferring pallet is provided on each side of said means for elevating and lowering the pallet for a single-article.

3. A transferring apparatus comprising a means for elevating and lowering a pallet for a single-article, a means for elevating and lowering a transferring pallet, a carriage for picking up one layer of articles at a time from said pallet for a single-article to unload said layer of articles onto said transferring pallet, and a means for regulating a transfer path for said carriage, wherein the apparatus includes a plurality of means for elevating and lowering a transferring pallet along the transfer path for the carriage and a control means for controlling said carriage to unload onto each transferring pallet only odd- or only even-numbered layers of articles from said pallet for a single-article, and the apparatus has a means for determining from the elevated position of said means for elevating and lowering the pallet for a single-article whether the top layer of said pallet for a single-article is an even- or odd-numbered layer.

4. A transferring apparatus according to claim 3 wherein one of said means for elevating and lowering a transferring pallet is provided on each side of said means for elevating and lowering the pallet for a single-article.

5. A transferring apparatus comprising a means for elevating and lowering a pallet for a single-article, a first means for elevating and lowering a first transferring pallet, a second means for elevating and lowering a second transferring pallet, a carriage for insertion between layers of articles on said pallet for a single-article to pick up one layer of articles at a time and unloading said layer of articles onto any one of said first transferring pallet and said second transferring pallet, and a means for regulating a transfer path for said carriage, wherein said means for elevating and lowering the pallet for a single-article is provided in an intermediate portion of the transfer path for said carriage, said first means for elevating and lowering said first transferring pallet and said second means for elevating and lowering said second transferring pallet are provided at both ends of the transfer path, respectively, and said carriage is arranged so as to travel back and forth between both ends to unload onto each of said first transferring pallet and said second transferring pallet only odd- or only even-numbered layers of articles from said pallet for a single-article.

* * * * *